United States Patent [19]

Beard et al.

[11] Patent Number: 4,528,311

[45] Date of Patent: Jul. 9, 1985

[54] ULTRAVIOLET ABSORBING POLYMERS COMPRISING 2-HYDROXY-5-ACRYLYLOXYPHENYL-2H-BENZOTRIAZOLES

[75] Inventors: Charles D. Beard, Sierra Madre, Calif.; Akira Yamada, Kyoto, Japan; Namassivaya Doddi, Upland, Calif.

[73] Assignee: Iolab Corporation, Covina, Calif.

[21] Appl. No.: 512,860

[22] Filed: Jul. 11, 1983

[51] Int. Cl.$^3$ ............... C08F 120/26; C08F 120/36
[52] U.S. Cl. ................... 524/91; 351/160 H; 525/204; 526/259; 548/259; 548/261
[58] Field of Search ........... 524/91; 525/204; 526/259; 548/259, 261; 351/160 H

[56] References Cited

U.S. PATENT DOCUMENTS

| | | | |
|---|---|---|---|
| 3,162,676 | 12/1964 | Goldberg et al. | 560/221 |
| 3,218,332 | 11/1965 | Heller et al. | 548/259 |
| 3,272,891 | 9/1966 | Milionis et al. | 525/204 |
| 3,313,664 | 4/1967 | Horton et al. | 524/291 |
| 3,391,107 | 7/1968 | Coleman | 528/77 |
| 3,399,173 | 8/1968 | Heller et al. | 526/259 |
| 3,493,539 | 2/1970 | Skoultchi et al. | 526/259 |
| 4,233,430 | 11/1980 | Jacquet et al. | 526/259 |
| 4,260,768 | 4/1981 | Lorenz et al. | 526/259 |
| 4,276,401 | 6/1981 | Karrer | 526/259 |
| 4,278,590 | 7/1981 | Dexter et al. | 524/91 |
| 4,304,895 | 12/1981 | Loshnek | 526/313 |
| 4,310,650 | 1/1982 | Gupta et al. | 526/313 |

FOREIGN PATENT DOCUMENTS 885986 1/1962 United Kingdom .

Primary Examiner—Lester L. Lee
Attorney, Agent, or Firm—Wayne R. Eberhardt

[57] ABSTRACT

Ultraviolet light absorbing polymer compositions comprising copolymers of 2-Hydroxy-5-acrylyloxyphenyl-2H-benzotriazoles with one or more other monomers copolymerizable therewith, particularly acrylic monomers are useful in the manufacture of occular devices, particularly intraoccular lenses and contact lenses. Polymers of the disclosed benzotriazoles may be added to other organic materials to impart ultraviolet absorbing properties thereto.

23 Claims, 2 Drawing Figures

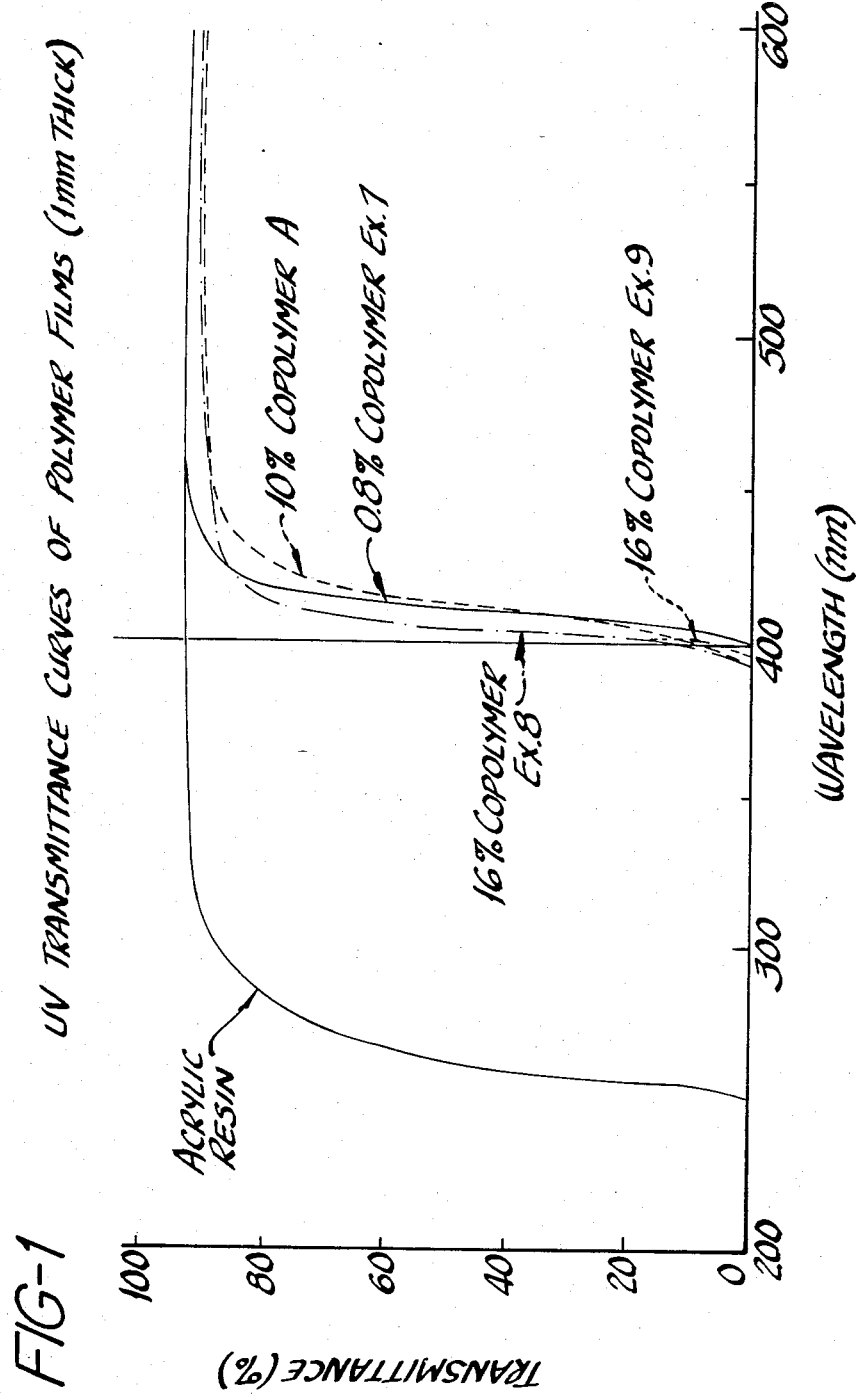

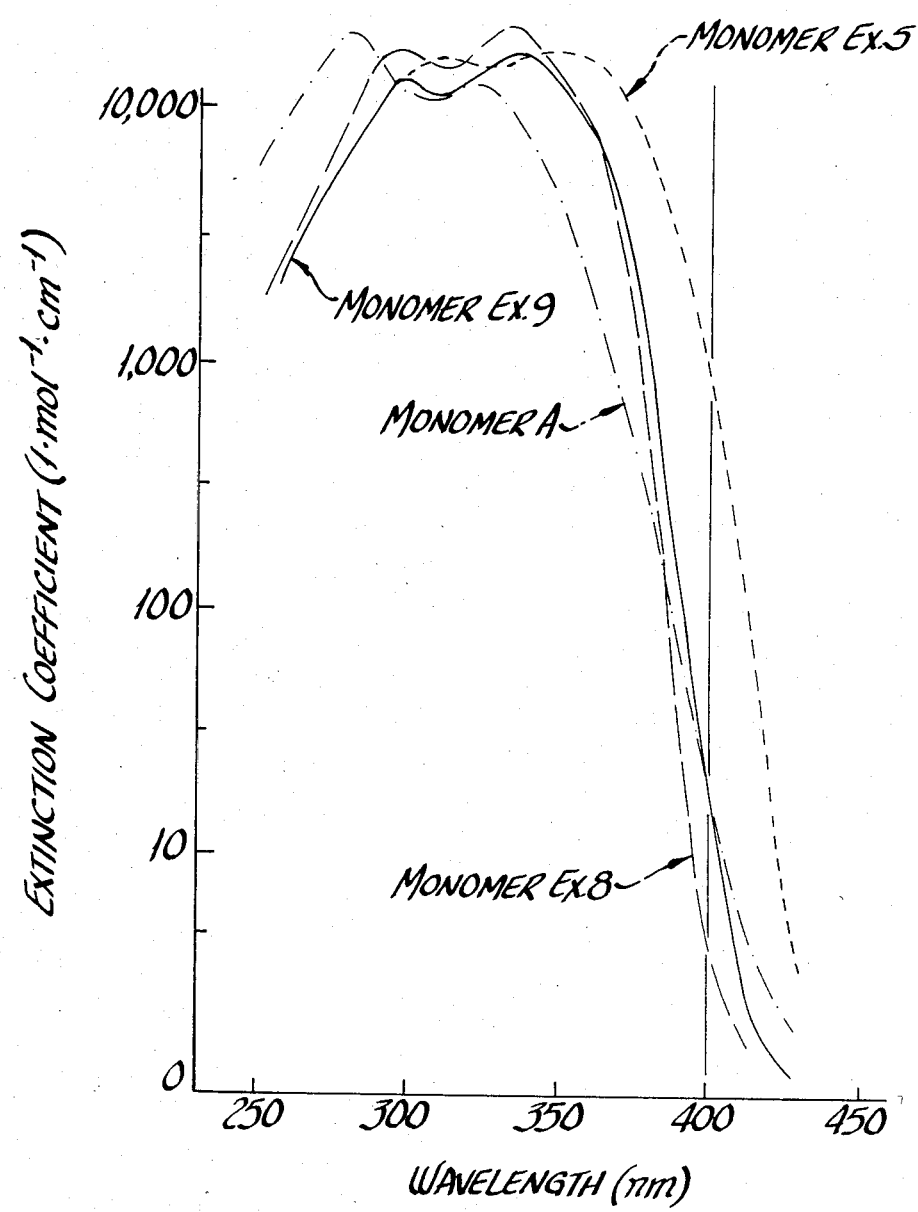

ULTRAVIOLET ABSORBING POLYMERS COMPRISING 2-HYDROXY-5-ACRYLYLOXYPHENYL-2H-BENZOTRIAZOLES

BACKGROUND OF THE INVENTION

This invention relates to ultraviolet light absorbing polymer compositions, and more particularly, to polymer compositions comprising copolymers of 2-Hydroxy-5-acrylyloxyalkylphenyl-2H-benzotriazoles with one or more other monomers copolymerizable therewith, particularly acrylic monomers. This invention further relates to occular devices, particularly intraoccular lenses and contact lenses, prepared from such ultraviolet light absorbing polymers.

The absorption of radiation in the ultraviolet range by polymeric materials is a major cause of the light-induced degradation therein. It is standard practice to add a low molecular weight UV "stabilizer" to light-sensitive polymers to absorb the light in the destructive range or to quench the energy generated as a result of the excitation of the light-absorbing functional groups in the polymer.

Although low molecular weight UV absorbers or quenchers of various types are effective in inhibiting or retarding the destruction of the polymers to which they are added, their extractibility in various media and/or their volatility during the processing or fabrication of the polymers at elevated temperatures, provide a limitation on their utility.

This problem has been remedied to a considerable extent by the synthesis of copolymerizable monomers containing structural moieties capable of functioning as UV absorbers or quenchers. The copolymerization of such monomers results in the formation of copolymers with increased stability, i.e. resistance to degradation upon exposure to UV light with decreased extractibility and volatility. The addition of such copolymers to a suitable matrix polymer imparts these properties to the latter.

Examples of monomeric ultraviolet absorbers copolymerizable with acrylic monomers as disclosed in U.S. Pat. No. 4,304,895 for use in the preparation of UV absorbing hard contact lenses are vinyl type comonomers is broadly disclosed in U.S. Pat. No. 3,162,676.

UV absorbing lenses are particularly desirable for use by persons who have had their natural lenses surgically removed due to cataracts or some damage or natural deterioration of the lens. The visual correction of aphakia resulting from such lens removal requires the use of high plus corrective lens which may be in the form of specticles, contact lens or intraoccular lens.

A portion of incident light entering the eye is normally absorbed by various parts of the eye so that only the unabsorbed or transmitted portion strikes the retina. The incident light is, of course, comprised of the entire spectrum of wavelengths including the ultraviolet, visible and infrared.

The cornea preferentially absorbs that portion of the light with wavelengths up to about 300 nm. The crystalline lens preferentially absorbs the wavelengths from about 300 up to about 400 nm. There is also a characteristic absorption of the visible portion of the spectrum by other parts of the eye. The overall result of the various absorptions in the human eye is to permit the unabsorbed light to be transmitted to the retina, this light being defined by wavelength and intensity at each wavelength. It is apparent that in the aphakic eye, where there is no crystalline lens, light from 300 to 400 nm will be transmitted to the retina and that absorption in the visible range of the spectrum will also be changed to the extent that such visible light would have been absorbed by the crystalline lens. Accordingly, the entire spectrum of the light striking the retina in the aphakic eye is different from that in the normal eye.

Intraoccular lenses and hard contact lenses are presently produced from polymethylmethacrylate polymers which exhibit a combination of properties desirable for such products, particularly optical clarity, the capability of being cut and polished or molded to specific optical powers, and chemical inertness. UV absorbing lenses of PMMA are required to maintain these properties while achieving at least 85% absorption of light at 400 nm based on a polymer film thickness of 1 mm. In addition, the absorption must cut off sharply above 400 nm to avoid yellowing of the lens.

While the hydroxy benzophenones copolymerizable with acrylate monomers are effective UV absorbers and

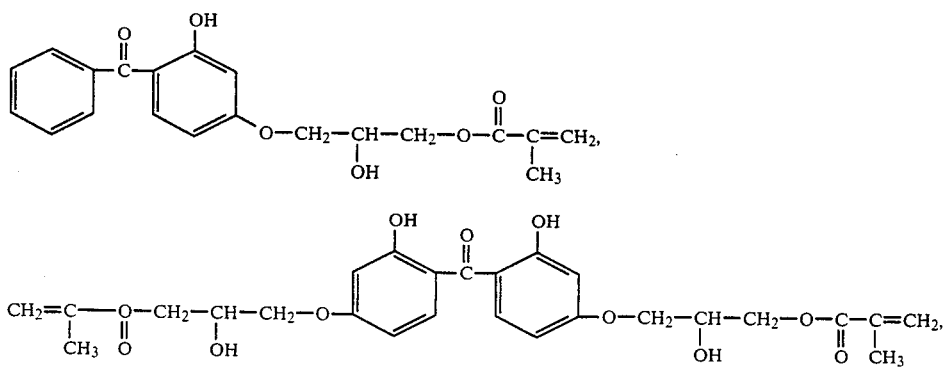

2-hydroxy-4-methacryloxy benzophenone and mixtures thereof.

Similarly, the copolymerization of an allyl-2-hydroxybenzophenone with an acrylate ester such as methyl methacrylate is described in U.S. Pat. No. 4,310,650, and, the copolymerization of ethylenically unsaturated derivatives of 2,4-dihydroxybenzophenone with other form chemically stable copolymers, relatively large amounts, i.e. 3 to 10% by weight, must be incorporated in the polymer to obtain 85% UV absorption at 400 nm and 1 mm thickness, and the compounds exhibit very broad absorption bands which extend into the visible range. Thus, polymers containing sufficient amounts of the benzophenone to provide effective UV absorption often have a significantly yellow cast.

It is accordingly an object of the present invention to provide a copolymer composition with improved UV absorption characteristics. It is a further object to provide a new UV absorbing composition which is copolymerizable with vinyl monomers. A yet further object is to provide a new composition of matter which when copolymerized with acrylic-type monomers is effective to absorb at least 85% of incident UV light at 400 nm and 1 mm thickness.

It is a further object to provide a new composition of matter which effectively absorbs UV light in the range of 300 to 400 nm but cuts off sharply above 400 nm.

These and other objects of the present invention will be apparent from the ensuing description and claims.

SUMMARY OF THE INVENTION

There is provided as a new composition of matter 2-Hydroxy-5-acryloxyalkylphenyl-2H-benzotriazoles of the structure

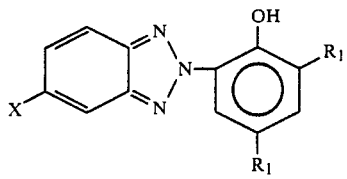

wherein X is H or halogen, each $R_1$ is selected from the group consisting of H, $CH_3$, t-alkyl of 4 to 6 carbons and

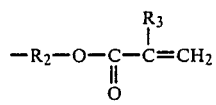

wherein $R_2$ is $C_2$–$C_{10}$ alkylene which may be straight chain or branched, and $R_3$ is H or $CH_3$, provided that one $R_1$ is H, $CH_3$, or t-alkyl and the other $R_1$ is

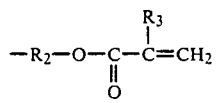

The above defined benzotriazoles are copolymerizable with vinyl monomers such as methyl methacrylate to yield optically clear polymers useful in the preparation of intraoccular and contact lenses. From 0.05 to about 20% by weight of the benzotriazole compound may be incorporated in the copolymer, the minimum effective amount for 85% absorption at 400 nm and 1 mm film thickness depending upon the particular structure of the benzotriazole compound. High molecular weight homopolymers of the benzotriazole monomers may also be prepared and incorporated into a variety of organic materials to impart UV absorption properties thereto.

DESCRIPTION OF DRAWINGS

FIG. 1 is a plot of the UV transmittance curve for the polymer of Example 7.

FIG. 2 is a plot of extinction coefficient curves for selected compounds of the present invention.

DETAILED DESCRIPTION

The benzotriazole monomers of the present invention are those compositions defined by the structure

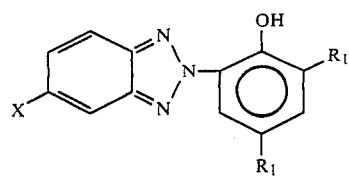

wherein X is H or halogen, each $R_1$ is selected from the group consisting of H, $CH_3$, t-alkyl of 4 to 6 carbons and

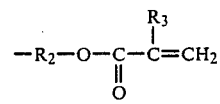

wherein $R_2$ is $C_2$–$C_{10}$ alkylene which may be straight chain or branched, and $R_3$ is H or $CH_3$, provided that one $R_1$ is H, $CH_3$, or t-alkyl and the other $R_1$ is

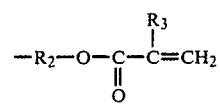

Particularly preferred compounds are those where X is H or chlorine, $R_1$ is H or t-butyl, $R_2$ is ethylene or propylene and $R_3$ is methyl.

Specific preferred compounds encompassed by the above formula include:

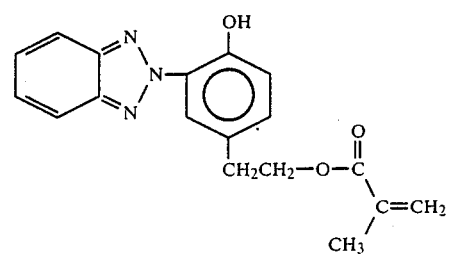

2-(2'-Hydroxy-5'-methacrylyloxyethylphenyl)-2H—benzotriazole

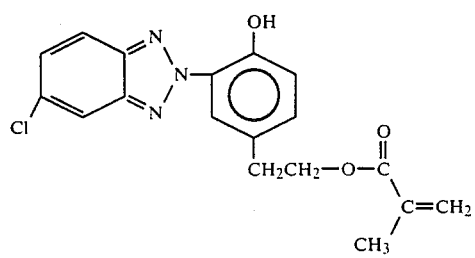

2-(2'-Hydroxy-5'-methacrylyloxyethylphenyl)-5-chloro-2H—benzotriazole

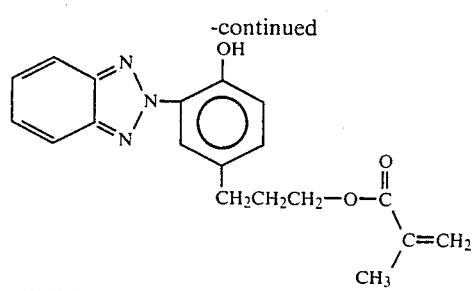

2-(2'-Hydroxy-5'-methacrylyloxypropylphenyl)-2H—benzotriazole

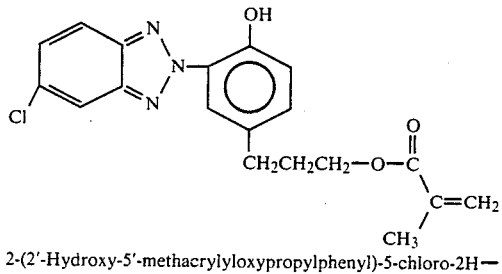

2-(2'-Hydroxy-5'-methacrylyloxypropylphenyl)-5-chloro-2H—benzotriazole

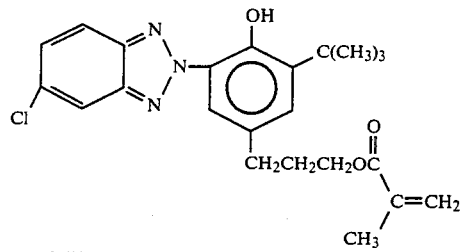

2-(2'-Hydroxy-5'-methacrylyloxypropyl-3'-tert-butylphenyl)-5-chloro-2H—benzotriazole

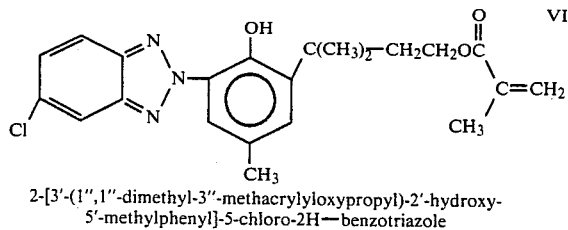

2-[3'-(1''',1'''-dimethyl-3''-methacrylyloxypropyl)-2'-hydroxy-5'-methylphenyl]-5-chloro-2H—benzotriazole A particularly preferred benzotriazole UV absorbing monomer of the present invention is compound V above. This compound is copolymerizable with methyl methacrylate and other vinyl type monomers and imparts excellent UV absorbing properties to the copolymer even at concentrations of 1.0% or less. The preparation of this compound, its copolymerization with methyl methacrylate, and the UV transmission characteristics of the resulting polymer, are described in the following examples.

EXAMPLE 1

Preparation of Intermediate
3-(3',5'-Di-tert-butyl-4'-hydroxyphenyl)-1-propanol

A solution of methyl 3-(3',5'-di-tert-butyl-4'-hydroxyphenyl)propionate (117 g, 0.4 mol) in 200 ml of anhydrous ether was added dropwise to a mixture of lithium aluminum hydride (17 g, 0.45 mol) and anhydrous ether (800 ml) under an inert atmosphere with ice-water cooling. After the addition was completed, the reaction mixture was heated at reflux temperature for one hour, then cooled to room temperature. To the cooled mixture was added dropwise 80 ml of 3% sodium hydroxide aqueous solution with vigorous stirring and with ice-water cooling. After the addition was completed, the mixture was stirred at room temperature for 30 minutes. A white precipitate was separated by filtration and washed with ether. The filtrate and washings were combined and evaporated. The residue was vacuum distilled to give 101 g (95%) of the product.

EXAMPLE 2

Preparation of Intermediate
3-(3'-tert-Butyl-4'-hydroxyphenyl)-1-propanol 3-(3',5'-Di-tert-butyl-4'-hydroxyphenyl)-1-propanol (100 g, 0.38 mol) was dissolved in 500 ml of trifluoroacetic acid. The solution was stirred at 40° C. for six hours, then poured into an ice-water mixture. The mixture was extracted with methylene chloride. The methylene chloride layer was washed with aqueous sodium carbonate and evaporated. A solution of sodium hydroxide (25 g) in 400 ml of methanol was added to the residue. The mixture was stirred at room temperature for 30 minutes, neutralized with 1N hydrochloric acid and extracted with methylene chloride. The methylene chloride layer was washed with aqueous sodium carbonate and water, dried with anhydrous potassium carbonate, and evaporated. The residue was vacuum distilled to give 51 g (64%) of the product.

EXAMPLE 3

Preparation of Intermediate
2-tert-Butyl-4-hydroxypropyl-6-(4'-chloro-2'-nitro phenylazo)phenol 4-Chloro-2-nitroaniline (72 g, 0.42 mol) was diazotized in the usual manner such as described in the literature [H. E. Fierz-David and L. Blangley, "Fundamental Processes of Dye Chemistry" p. 247 (Interscience, New York 1949)]. The diazonium salt solution was added dropwise to a stirred mixture of 3-(3'-tert-butyl-4'-hydroxyphenyl)-1-propanol (88.5 g, 0.42 mol), concentrated hydrochloric acid (108 g), water (920 ml) and sodium lauryl sulfate (10 g) at 40° C. The mixture was stirred at 40° C. for sixteen hours, then allowed to stand. After the azo dye settled, the supernatant liquid was decanted. The azo dye was washed with warm water, and the washings decanted. The azo dye was used for the next reaction without further purification.

EXAMPLE 4

Preparation of Intermediate
2-(2'-Hydroxy-5'-hydroxypropyl-3'-tert-butylphenyl)-5-chloro-2H-benzotriazole The azo dye of Example 3 was dissolved in 1.7 l of ethanol. A solution of 151 g of glucose in 1.7 l of 2N sodium hydroxide was added to the azo dye solution. The mixture was stirred at room temperature and, after 24 hours of stirring, 131 g of zinc dust was added to the reaction mixture. The mixture was stirred for another two hours at room temperature. The zinc was separated by filtration and washed with ethanol, methylene chloride and ethanol. The filtrate and washings were combined and acidified with concentrated hydrochloric acid. The aqueous layer was extracted with methylene chloride. The combined organic layer was washed with 1N hydrochloric acid and water, dried with potassium carbonate and evaporated. The residue was vacuum distilled to give 107 g (61%) of the benzotriazole. The distillate was further purified by column chromatography and recrystallization. A pure sample showed a m.p. of 110°–111° C. and λ max peaks at 311 and 350 nm ($\epsilon_{311} = 1.44 \times 10^4$, $\epsilon_{350} = 1.58 \times 10^4$ l mol$^{-1}$ cm$^{-1}$).

EXAMPLE 5

Preparation of 2-(2'-Hydroxy-5'-methyacrylyloxypropyl-3'-tert-butylphenyl)-5-chloro-2H-benzotriazole Methacrylyl chloride (5.9 ml) and triethylamine (8.5 ml) were added dropwise at −5° C. to a solution of 2-(2'-hydroxy-5'-hydroxypropyl-3'-tert-butylphenyl)-5-chloro-2H-benzotriazole (20 g) in 250 ml of methylene chloride. The reaction mixture was stirred at 0° C. overnight and then washed with 1N hydrochloric acid and water. The methylene chloride solution of the product was dried with sodium sulfate, passed through alumina column and evaporated. The crude yield of the product was 22 g (90%). A polymerization grade sample was obtained by recrystallization from methanol—methylene chloride mixture, m.p. 74.5°–76.5° C.

Other 2-(2'-hydroxy-5'-methacrylyloxyalkyl-3'-tert-butylphenyl)-5-chloro-2H-benzotriazoles are readily prepared using a similar procedure and substituting the appropriate benzotriazole alkanol for the intermediate of Example 1. Such compounds wherein the alkanol is $C_3$ to $C_8$ are described, for example, in U.S. Pat. No. 4,260,832.

EXAMPLE 6

Polymerization 0.1 g of the benzotriazole product of Example 5, 2.0 g of ethyl acrylate, 22.9 g of methyl methacrylate, 89 μl of 1-dodecanethiol, 0.12 g of stearic acid and 20.3 mg of azobisisobutyronitrile were placed in a Pyrex tube. The tube was flushed with argon and then sealed. The mixture was polymerized at 70° C. for six hours. The resulting polymer containing 0.4% of the benzotriazole was hot pressed into 1 mm thick film. GPC showed that the UV absorbing group was chemically bonded in the polymer matrix. The film showed transmittance of 17.2% at 400 nm and 0% at 388 nm.

EXAMPLE 7

Polymerization

The procedure of Example 6 was followed using 0.2 g of the benzotriazole product of Example 5, 1.9 g of ethyl acrylate, 23.0 g of methyl methacrylate, 89 μl of 1-dodecanethiol, 0.12 g of stearic acid and 20.3 mg of azobisisobutyrontrile. A 1 mm thick film prepared of the resulting polymer which contained 0.8% of the benzotriazole showed transmittance of 3.4% at 400 nm and 0% at 395 nm. A UV transmittance curve for the polymer of this example is plotted in FIG. 1 in comparison with a copolymer of methylmethacrylate containing 10 percent 4-(2'-Acrylyloxyethoxy)-2-hydroxybenzophenone (Copolymer A), a copolymerizable UV absorbing monomer of the prior art. The transmittance curve for a commercial acrylic resin not containing any UV absorber is also included for reference.

The following examples describe the preparation of other benzotriazole UV absorbing compounds within the scope of the present invention.

EXAMPLE 8

2-(2'-Hydroxy-5'-methacrylyloxyethylphenyl)-2H-benzotriazole

The synthesis of the above compound involved the esterification of 2-(2'-hydroxy-5'-hydroxyethylphenyl)-benzotriazole as illustrated by the following reaction scheme.

2-(2'-Hydroxy-5'-hydroxyethylphenyl)-2H-benzotriazole (150 g, 0.59 mol), methacrylic acid (55 ml, 0.65 mol), hydroquinone (2.4 g), p-toluenesulfonic acid monohydrate (3 g) and toluene (2 l) were placed in a 3 liter flask equipped with a Dean and Stark receiver. After 1.5 hours of refluxing the mixture, another 2.7 g of p-toluenesolfonic acid monohydrate was added and the refluxing was continued for another 15.5 hours. Approximately 10 ml of water was collected (theoretical: 10.6 g) and the yield of the desired compound was 93.7% as judged by a gas chromatography. Another 1 g of p-toluenesolfonic acid monohydrate was added and the reflusing was continued for another 3 hours. A yield of 95.6% was shown by a gas chromatography. After cooling the reaction mixture, it was washed with aqueous sodium hydrogen carbonate solution, water, 5% hydrochloric acid and water. The organic layer was dried with anhydrons magnesium sulfate and chromatographed through an alumina (Fisher, 80–200 mesh) column. After evaporation of the solvent, the residue was recrystallized from distilled methanol twice. Yield: 141.8 g (74%); Purity: >99.9% (G.C.). The IR and NMR data were consistent with the structure.

EXAMPLE 9

2-(2'-Hydroxy-5'-methacrylyloxypropylphenyl)-2H-benzotriazole

The above compound was synthesized using a procedure analogous to that of Example 8, with 2-(2'-Hydroxy-5'-hydroxypropylphenyl)-2H-benzotriazole as the starting reactant. Comparable yields of purified monomer were obtained without difficulty.

The monomers of Example 8 and Example 9 were readily copolymerized with methylmethacrylate and ethylacrylate and hot pressed into films as described above. While both monomers were effective UV absorbers, significantly higher concentrations were required to achieve 85% absorption at 400 nm on 1 mm thick films as compared to the preferred monomer of Example 5. Comparative data is as follows:

| UV Absorber | Wt. % in Copolymer in 1 mm Film to Achieve 85% Absorption at 400 nm |
|---|---|
| Example 5 | <1.0 |
| Example 8 | 14–16 |
| Example 9 | 10 |
| Monomer A[1] | 8 |

[1]Monomer A = 4-(2'-Acrylyloxyethoxy)-2-hydroxybenzophenone

Extinction coefficients of the benzotriazole monomers of Examples 5, 8, and 9 and of Monomer A were measured in methylene chloride solution. The extinction coefficient ε is a measure of the molar absorptivity of a compound according to the following equation:

$$\epsilon = A/cb$$

wherein

A = absorbance;

c = concentration of the solute (mol/liter); and
b = path length of radiation within the sample (cm).

Absorbance is determined according to conventional procedures using a UV-Visible Spectrophotometer as described, for example, in R. M. Silverstein and G. C. Bassler, "Spectrometric Identification of Organic Compounds", 2nd Edition, John Wiley & Sons, Inc., New York, 1967. Since $\epsilon$ is proportional to absorbance, a compound which has a larger $\epsilon$ gives greater UV absorption at lower concentrations.

The benzotriazoles of the present invention absorb strongly in the UV range of 200–400 nm and to cut off sharply above 400 nm. The hydroxy benzophenone control (Monomer A) absorbs less strongly and exhibits a broader absorption band extending into the visible range. Extinction coefficient curves for the above monomers are plotted in FIG. 2, and the data are summarized in the following table:

| ULTRAVIOLET EXTINCTION COEFFICIENTS | | | | | |
|---|---|---|---|---|---|
| | $\lambda max_1$ | $\lambda max_2$ | $\epsilon(1\ mol^{-1}\ cm^{-1})$ | | |
| UV ABSORBER | nm | nm | $\lambda max_1$ | $\lambda max_2$ | 400 nm |
| Example 5 | 311 | 348 | 14,675 | 16,286 | 755 |
| Example 8 | 298 | 336 | 13,496 | 17,181 | 7 |
| Example 9 | 299 | 337 | 13,555 | 16,326 | 22 |
| Monomer A | 285 | 323 | 15,783 | 10,175 | 25 |

Other 2-(2'-hydroxy-5'-methacrylyloxyalkylphenyl)-2H-benzotriazoles are readily prepared following the procedure of Example 8 using the appropriate 2-(2'-hydroxy-5'-hydroxyalkylphenyl)-2H-benzotriazole as the starting reactant. Alkyl groups containing from 2 to 8 carbon atoms are preferred for these compounds.

EXAMPLE 10

The monomer of Example 8 (>99.9% pure) was homopolymerized in toluene at 50° C. for 63 hours to obtain essentially 100% conversion to a high molecular weight polymer having an inherent viscosity of 1.87 dl/g measured as 0.5% by weight solution in chloroform at 25° C., Tg 116° C. The homopolymer was useful as an additive for incorporation in polymer films to enhance UV absorption properties.

EXAMPLE 11

The monomer of Example 8 was copolymerized with methyl methacrylate, and with selected third monomers following the general procedure of Example 6 to obtain various copolymers and terpolymers useful in the manufacture of intraoccular lenses. Preferred polymers were selected on the basis of Tg and melt index values amiable to injection molding, and on the basis of good optical clarity. Terpolymers of MMA with 16% of the monomer of Example 8 and either 6% stearyl methacrylate or 10% ethyl acrylate gave particularly good optical clarity with no significant yellowing effect. The benzotriazole monomer of Example 8 is accordingly a preferred UV absorber for applications where yellowing of the base polymer is to be avoided. The terpolymer films had transmittance values of 10–14% at 400 nm and 88–90% at 700 nm. Inherent viscosity of the terpolymer ranged in values from about 0.35 to 0.80, and Tg was in the order of 110°–115° C.

Comparable copolymers of MMA with 16% of the benzotriazole monomer of Example 9 and terpolymers with 10% ethyl acrylate were prepared and pressed into films. Transmittance values for those films was 4–5% at 400 nm and 85–88% at 700 nm, indicating that the monomer of Example 9 is a more effective UV absorber than the monomer of Example 8.

The benzotriazoles of the present invention may be copolymerized with any of a number of unsaturated monomers to provide polymeric compositions having desirable UV absorbing characteristics. Alternatively, homopolymers or copolymers of the benzotriazoles of the present invention may be utilized as additives to a wide variety of organic polymers to provide UV absorption properties. Representative of the polymers and copolymers useful in conjunction with the benzotriazole monomers and polymers of the present invention are:

a. Polymers which are derived from mono- or diolefins, e.g., polyethylene which can optionally be crosslinked, polypropylene, polyisobutylene, polymethylbutene-1, polymethylpentene-1, polyisoprene, polybutadiene.

b. Mixtures of the homopolymers cited under (1), for example mixtures of polypropylene and polyethylene, polypropylene and polybutene-1, polypropylene and polyisobutylene.

c. Copolymers of the monomers based on the homopolymers cited under (1), for example ethylene/propylene copolymers, propylene/butene-1 copolymers, propylene/isobutylene copolymers, ethylene/butene-1 copolymers as well as terpolymers of ethylene and propylene with a diene, for example hexadiene, dicyclopentadiene or ethylidene norbornene, and copolymers of α-olefins, e.g., ethylene with acrylic or methacrylic acid.

d. Polystyrene.

e. Copolymers of styrene and of -methylstyrene, for example styrene/butadiene copolymers, styrene/acrylonitrile copolymers, styrene/acrylonitrile/methacrylate copolymers, styrene/acrylonitrile copolymers modified with acrylic ester polymers to provide impact strength as well as block copolymers, e.g., styrene/butadiene/styrene block copolymers.

f. Graft copolymers of styrene, for example the graft polymer of styrene to polybutadiene, the graft polymer of styrene with acrylonitrile to polybutadiene as well as mixtures thereof with the copolymers cited under (5), commonly referred to as acrylonitrile/butadiene/styrene or ABS plastics.

g. Halogen-containing vinyl polymers, for example polyvinyl chloride, polyvinylidene chloride, polyvinyl fluoride, polychloroprene, chlorinated rubbers, vinyl chloride/vinylidene chloride copolymers, vinyl chloride/vinyl acetate copolymers, vinylidene chloride/vinyl acetate copolymers.

h. Polymers which are derived from α,β-unsaturated acids and derivatives thereof, polyacrylates and polymethacrylates, polyacrylic amides and polyacrylonitrile. The instant compounds are advantageously used in heat-curable acrylic resin lacquers which are composed of a copolymer of acrylic acid and one or more of its derivatives, and a melamine-formaldehyde resin.

i. Polymers which are derived from unsaturated alcohols and amines and from the acyl derivatives thereof or acetals, for example polyvinyl alcohol, polyvinyl acetate, polyvinyl stearate, polyvinyl benzoate, polyvinyl maleate, polyvinyl butyral, polyallyl phthalate, polyallyl melamine and copolymers thereof with other vinyl compounds, for example ethylene/vinyl acetate copolymers.

j. Homopolymers and copolymers which are derived from epoxides, for example polyethylene oxide or the polymers which are derived from bis-glycidyl ethers.

k. Polyacetals, for example polyoxymethylene, as well as polyoxymethylenes which contain ethylene oxide as comonomer.

l. Polyalkylene oxides, for example polyoxyethylene, polypropylene oxide or polybutylene oxide.

m. Polyphenylene oxides.

n. Polyurethanes and polyureas, such as in urethane coatings.

o. Polycarbonates.

p. Polysulfones.

q. Polyamides and copolyamides which are derived from diamines and dicarboxylic acids and/or from aminocarboxylic acids or the corresponding lactams, for example polyamide 6, polyamide 6/6, polyamide 6/10, polyamide 11, polyamide 12, poly-m-phenylene-isophthalamide.

r. Polyesters which are derived from dicarboxylic acids and dialcohols and/or from hydroxycarboxylic acids or the corresponding lactones, for example polyethylene glycol terephthalate, poly-1,4-dimethylolcyclohexane terephthalate.

s. Cross-linked polymers which are derived from aldehydes on the one hand and from phenols, ureas and melamine on the other, for example phenol/formaldehyde, urea/formaldehyde and melamine/formaldehyde resins.

t. Alkyd resins, for example glycerol/phthalic acid resins and mixtures thereof with melamine/formaldehyde resins.

u. Unsaturated polyesters resins which are derived from copolyesters of saturated and unsaturated dicarboxylic acids with polyhydric alcohols as well as from vinyl compounds as cross-linking agents and also the halogen-containing, flame-resistant modifications thereof.

v. Natural polymers, for example cellulose, rubber, as well as the chemically modified homologous derivatives thereof, for example cellulose acetates, cellulose propionates and cellulose butyrates and the cellulose ethers, for example methyl cellulose.

Particularly useful compositions are copolymers comprising from 0.1 to 20% by weight of benzotriazoles of the present invention with other ethylenically unsaturated materials such as styrene, methylstyrene, acrylates, methacrylates, acrylamide, acrylonitrile, methacrylonitrile, vinylacetate, vinylidene chloride, vinyl chloride, vinyl fluoride, ethylene, propylene, and mixtures thereof.

The homopolymers and copolymers of the benzotriazoles of the present invention find wide application in formulating UV absorbing plastics and other organic materials wherever such materials are exposed to UV radiation from either natural or artificial sources. In addition to the medical use in intraoccular and contact lenses described above, the materials of the present invention are useful in many industrial applications such as in solar energy collectors, polymeric coatings, transparent plastic films, fluorescent light diffusers, packaging materials, vinyl window coverings, automobile paints and interior coverings, epoxys, fiberglass constructions and the like. Many other applications will be readily apparent to those familiar with this art as a result of proceeding specification.

We claim:

1. A compound of the formula

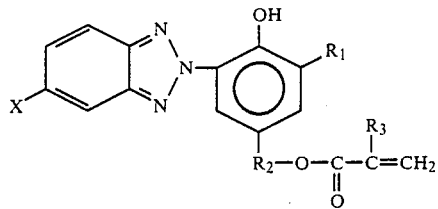

wherein

X is H or halogen, $R_1$ is selected from the group consisting of H, $CH_3$ and t-alkyl of 4 to 6 carbons, $R_2$ is $C_2$–$C_{10}$ alkylene which may be straight chain or branched, and $R_3$ is H or $CH_3$; and homopolymers thereof.

2. The compound of claim 1 wherein X is chlorine.

3. The compound of claim 1 wherein $R_3$ is $CH_3$.

4. The compound 2-(2'-Hydroxy-5'-methacryloxyethylphenyl)-2H-benzotriazole and homopolymers thereof.

5. The compound 2-(2'-Hydroxy-5'-methacrylyloxyethylphenyl)-5-chloro-2H-benzotriazole and homopolymers thereof.

6. The compound 2-(2'-Hydroxy-5'-methacrylyloxypropylphenyl)-2H-benzotriazole and homopolymers thereof.

7. The compound 2-(2'-Hydroxy-5'-methacrylyloxypropylphenyl)-5-chloro-2H-benzotriazole and homopolymers thereof.

8. The compound 2-(2'-Hydroxy-5'-methacrylyloxypropyl-3'-tert-butylphenyl)-2H-benzotriazole and homopolymers thereof.

9. The compound 2-(2'-Hydroxy-5'-methacrylyloxypropyl-3'-tert-butylphenyl)-5-chloro-2H-benzotriazole and homopolymers thereof.

10. An ultraviolet absorbing composition comprising a copolymer of an ethylenically unsaturated monomer and an effective amount of a compound of claim 1.

11. The composition of claim 10 wherein said ethylenically unsaturated material is selected from the group consisting of styrene, methylstyrene, acrylates, methylacrylates, acrylamide, acrylonitrile, methacrylonitrile, vinylacetate, vinylidene chloride, vinyl chloride, ethylene, propylene, and mixtures thereof.

12. The composition of claim 10 wherein said compound of claim 1 is 2-(2'-Hydroxy-5'-methacrylyloxypropyl-3'-tertbutylphenyl)-5-chloro-2H-benzotriazole and comprises from 0.05 to 20% by weight of said composition.

13. The composition of claim 12 wherein said UV absorbing composition comprises a copolymer of methyl methacrylate and from 0.05 to 5.0% by weight of said compound 2-(2'-Hydroxy-5'-methacrylyloxypropyl-3'-tertbutylphenyl)-5-chloro-2H-benzotriazole.

14. A composition comprising an organic polymer and as an ultraviolet absorbing additive thereto, from 0.05 to 20 percent by weight of a compound of claim 1.

15. The composition of claim 14 wherein said polymeric material is selected from the group consisting of polyvinyl halides, polyacrylates, polystyrene, polyvinylidene halides, polycarbonates and acrylonitrile-butadiene styrene terpolymers.

16. The composition of claim 15 wherein said compound of claim 1 is a homopolymer of compound 2-(2'-

Hydroxy-5′-methacrylyloxypropyl-3′-tert-butylphenyl)-5-chloro-2H-benzotriazole.

17. The composition of claim 16 wherein said homopolymer of compound 2-(2′-Hydroxy-5′-methacrylyloxypropyl-3′-tert-butylphenyl)-5-chloro-2H-benzotriazole is present in an amount of from 0.05 to 5% by weight.

18. A contact lens comprising an optically clear polymer composition of claim 10.

19. A contact lens comprising an optically clear polymer composition of claim 13.

20. An intraoccular lens comprising an optically clear polymer composition of claim 10.

21. An intraoccular lens comprising an optically clear polymer composition of claim 13.

22. A plastic film comprising the composition of claim 10.

23. A plastic film comprising the composition of claim 14.

* * * * *